(12) United States Patent
Xu et al.

(10) Patent No.: US 7,917,773 B2
(45) Date of Patent: Mar. 29, 2011

(54) VISIBILITY-AWARE SERVICES

(75) Inventors: Zhenbin Xu, Sammamish, WA (US); Peter A. Gurevich, Woodinville, WA (US); Joseph S. Laughlin, Redmond, WA (US); Andrei Pascovici, Bellevue, WA (US); David A. McCalib, Woodinville, WA (US); Sandra G. Roberts, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 11/799,568

(22) Filed: May 2, 2007

(65) Prior Publication Data

US 2008/0276248 A1    Nov. 6, 2008

(51) Int. Cl.
G06F 1/00     (2006.01)
G06F 1/32     (2006.01)
(52) U.S. Cl. .................. 713/300; 713/320; 713/323
(58) Field of Classification Search .................. 713/300
See application file for complete search history.

(56) References Cited

U.S. PATENT DOCUMENTS

| | | | |
|---|---|---|---|
| 5,598,565 A * | 1/1997 | Reinhardt ...................... | 713/323 |
| 6,009,429 A | 12/1999 | Greer et al. | |
| 6,012,071 A | 1/2000 | Krishna et al. | |
| 6,094,662 A | 7/2000 | Hawes | |
| 6,704,024 B2 | 3/2004 | Robotham et al. | |
| 6,734,873 B1 | 5/2004 | Herf et al. | |
| 6,801,811 B2 * | 10/2004 | Ranganathan et al. ......... | 700/22 |
| 6,934,743 B2 | 8/2005 | Huat | |
| 7,036,025 B2 * | 4/2006 | Hunter .......................... | 713/300 |
| 7,120,871 B1 | 10/2006 | Harrington | |
| 7,389,432 B2 * | 6/2008 | Chandley et al. ............. | 713/320 |
| 7,437,577 B2 * | 10/2008 | Obara et al. .................. | 713/300 |
| 2003/0182399 A1 | 9/2003 | Silber | |
| 2004/0070600 A1 | 4/2004 | Morrisroe et al. | |
| 2004/0078797 A1 | 4/2004 | Liao | |
| 2004/0233146 A1 * | 11/2004 | Nguyen .......................... | 345/82 |
| 2007/0126729 A1 * | 6/2007 | Yoon et al. .................... | 345/211 |
| 2007/0206262 A1 * | 9/2007 | Zhou ............................. | 359/267 |

FOREIGN PATENT DOCUMENTS

GB          2346228 A          8/2000

OTHER PUBLICATIONS

Lam, et al., "Summary Thumbnails: Readable Overviews for Small Screen Web Browsers", Date: Apr. 2005, http://delivery.acm.org/10.1145/1060000/1055066/p681-lam.pdf?key1=1055066&key2=0367721711&coll=ACM&dl=ACM&CFID=75919783&CFTOKEN=92791909.

Snyder Robin M., "A Web-Based System for Dynamic Teacher student Interaction in a Classroom Setting", Date: Jan. 2007, http://delivery.acm.org/10.1145/1190000/1181850/p9-snyder.pdf?key1=1181850&key2=1780821711&coll=GUIDE&dl=GUIDE&CFID=75919783&CFTOKEN=92791909.

* cited by examiner

*Primary Examiner* — Suresh K Suryawanshi

(57) ABSTRACT

The present visibility-aware service reduces power-intensive activities when a window associated with the visibility-aware service is not visible. The window is not visible when the window is minimized or when the window is switched from a foreground position to a background position on a display.

20 Claims, 4 Drawing Sheets

VISIBILITY-AWARE SERVICES

BACKGROUND

Maximizing battery life on a mobile device presents a persistent challenge to mobile device users. In order to aid users in maximizing battery life, many operating systems provide power management tools that allow users to customize consumers of battery power. Two of the biggest consumers of battery power are the display and the hard disk of the mobile device. The power management tools allow users to customize when the display and the hard disk are active. Another large consumer of battery power is power-intensive activities, such as animation. For example, animation requires processing power each time the screen is redrawn. Thus, this constant redrawing of the screen drains the battery.

Because mobile device users want the ability to surf the web when the mobile device is running on batteries, web pages that display animation present a difficult challenge for maximizing battery life. In addition, with the advent of tabbed browsers, multiple web pages that display animation further consume battery power, which reduces battery life. Therefore, mobile device users are not able to surf the web for as long as desired because the animation on the web pages reduce the battery life of the mobile device.

SUMMARY

Described herein are various technologies and techniques for minimizing battery power via a visibility-aware service. Implementations of the visibility-aware service reduce power-intensive activities when a window associated with the visibility-aware service is not visible.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many of the attendant advantages of the present visibility-aware services will become more readily appreciated, as the same becomes better understood with reference to the following detailed description. A brief description of each drawing is described below.

DETAILED DESCRIPTION

The following discussion first describes one example of an operating environment in which an example visibility-aware service may be implemented. The discussion then describes processing that implements a visibility-awareness feature that prolongs battery life. Next, the discussion describes a portion of an example application programming interface (API) for an example visibility-aware service. Lastly, the discussion describes one possible configuration for a device that implements the visibility-awareness feature.

However, before describing the above items, it is important to note that various embodiments are described fully below with reference to the accompanying drawings, which form a part hereof, and which show specific implementations for practicing various embodiments. Other embodiments may be implemented in many different forms and should not be construed as limited to the embodiments set forth herein; rather, these embodiments are provided so that this disclosure will be thorough and complete. Embodiments may take the form of a hardware implementation, a software implementation executable by a computing device, or an implementation combining software and hardware aspects. The following detailed description is, therefore, not to be taken in a limiting sense.

In various embodiments, the logical operations may be implemented (1) as a sequence of computer implemented steps running on a computing device and/or (2) as interconnected machine modules (i.e., components) within the computing device. The implementation is a matter of choice dependent on the performance requirements of the computing device implementing the embodiment. Accordingly, the logical operations making up the embodiments described herein are referred to alternatively as operations, steps, or modules.

An Example Operating Environment Implementing a Visibility-Aware Service

Figure 1:
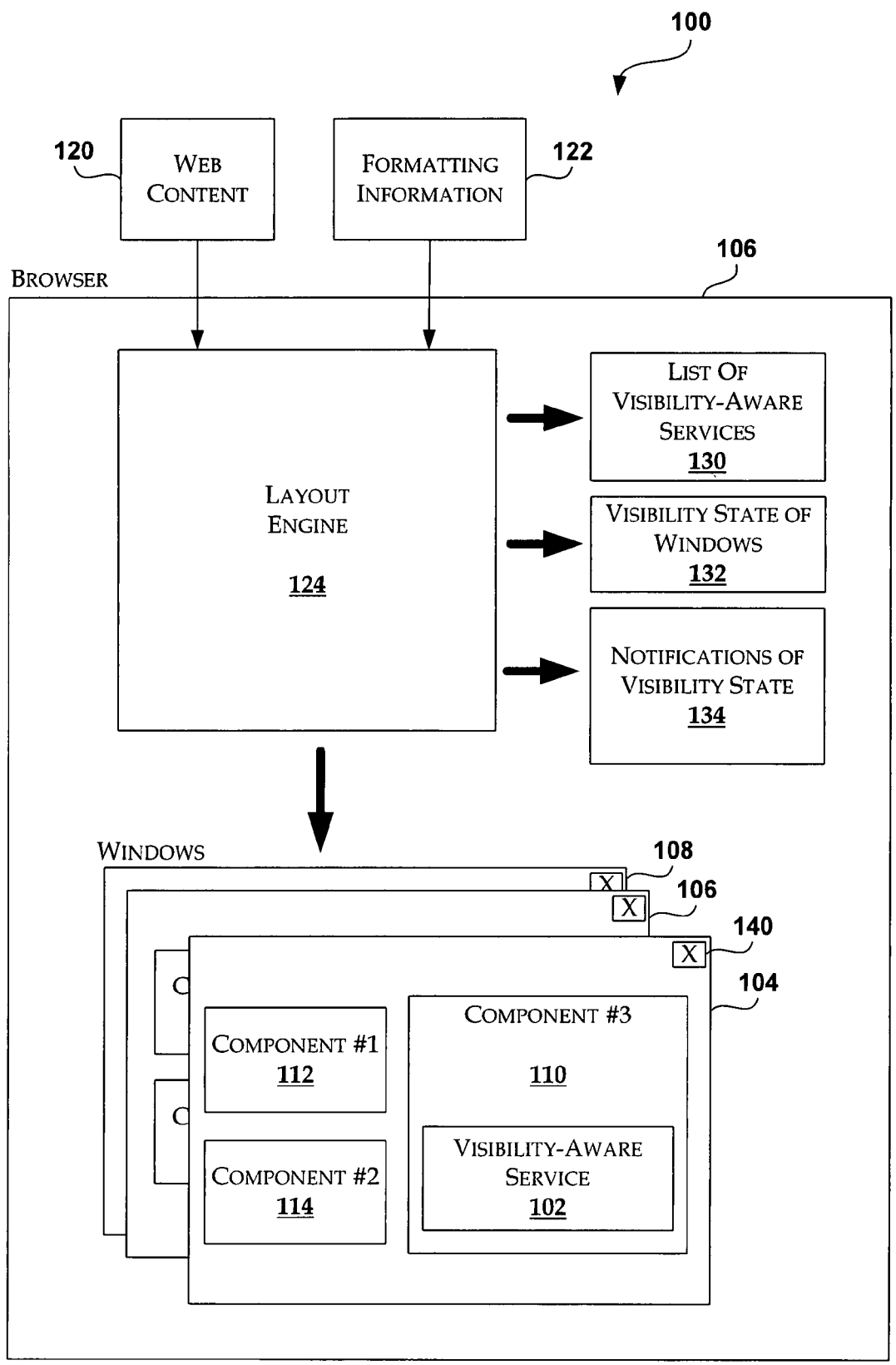
FIG. 1 is a graphical illustration of one example of an operating environment in which a visibility-aware service may be implemented.

FIG. 1 is a graphical illustration of one example of an operating environment 100 in which a visibility-aware service 102 may be implemented. In overview, a visibility-aware service is a service that reduces power-intensive activities when a window 104 associated with the visibility-aware service is not visible on a display. The window is associated with an application, such as a web browser, an email client, or any application that requires displaying of data. For example, the window may display output from a word processor, display an email message, display a web page, or display any type of output from an application. Power-intensive activities include animation, spell checking, and other processing that utilizes considerable power. The window associated with the visibility-aware service may become invisible when a minimize control 140 is selected to minimize the window, when the window is switched from a foreground position to a background position on the display, or when the window undergoes any type of change that reduces the prominence of the window on the display.

A visibility-aware service may be implemented in one of several different operating environments. The following discussion describes a visibility-aware service that is implemented in conjunction with a browser 1.06 in a browsing environment. The example visibility-aware service 102 is a timer service that is utilized by one or more components (e.g., components 110, 112, and 114) on a web page (i.e., window 104). Hereinafter, window 104 may be interchangeably referred to as web page 104 and visibility-aware service 102 may be interchangeably referred to as timer service 102 for convenience. Component 110 may execute a particular function (e.g., animation) based on an interval specified with the timer service. On each specified interval, there is a timer tick that informs component 110 to perform the animation. For example, component 110 may re-draw the animation after the specified interval (e.g., 100 ms). As will be described, the present timer service reduces animation processing for the associated web page when the web page is minimized or when the web page is switched from a foreground position to a background position on the display. Switching from a foreground position to a background position may occur by switching the web page from a foreground tab to a background tab in a tabbed browser. Because the present visibility-awareness feature reduces processing when the web page is not visible, battery consumption is reduced.

In the example browsing environment, web content 120 and formatting information 122 are supplied as input to a layout engine 124. Web content 120 includes hypertext markup language (HTML), extensible markup language (XML), image files, and other content that is displayable on a web page. Formatting information includes cascading style sheets (CSS), extensible style sheet language (XSL), and other technologies for defining document transformation and presentation. An application, such as browser 106, may utilize the layout engine to display the formatted web content on a screen. The layout engine 124 "paints" the web content in a content area of a window displayed on a monitor.

The layout engine 124 also maintains a list 130 of visibility-aware services (e.g., visibility-aware service 102). The layout engine updates the list of visibility-aware services when a visibility-aware service is created or released. In addition, the layout engine 124 maintains a visibility state 132 for each window (e.g., window 104, 106, and 108). The visibility state 132 for each window effectively controls power-intensive activity via a corresponding visibility-aware service 102. The layout engine sends notifications 134 of the visibility state of windows to associated visibility-aware services. Windows 104, 106, and 108 may be one of multiple tabbed windows in a tabbed browser, independent windows, or any window in which power-intensive activities occur. The layout engine may maintain the visibility state 132 for each window separately, jointly, or in any manner that correlates a window to an associated visibility state. In one embodiment, the layout engine maintains the list of visibility-aware components 130 and the visibility state of windows 132 per thread. For example, if each tabbed web page in a tabbed browser is a thread, the layout engine maintains the page visibility for each tabbed web page.

Example Processes Suitable for Implementing a Visibility-Awareness Feature

Figure 2:
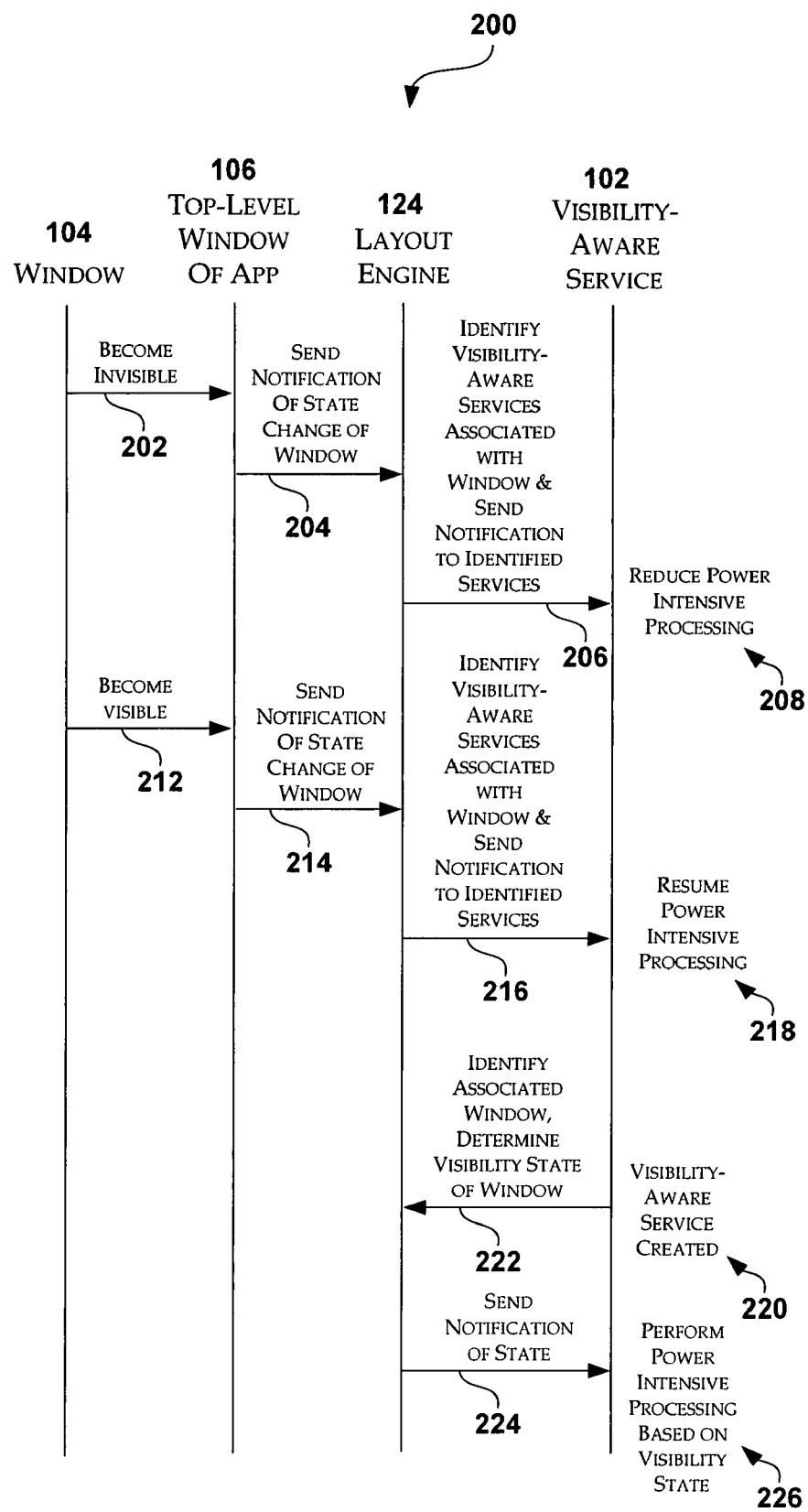
FIG. 2 is a processing diagram that graphically illustrates example processing that controls power-intensive activities based on a visibility state via a visibility-aware service.

FIG. 2 is a processing diagram that graphically illustrates example processing that controls power-intensive activities based on a visibility state via a visibility-aware service. For convenience, FIG. 2 describes the processing using the example operating environment 100 shown in FIG. 1. Thus, window 104, top-level window of application 106 (e.g., the browser), layout engine 124, and visibility-aware service 102 (e.g., timer service) are denoted in FIG. 2, each with a corresponding line that represents input and output from the respective element.

Figure 3:
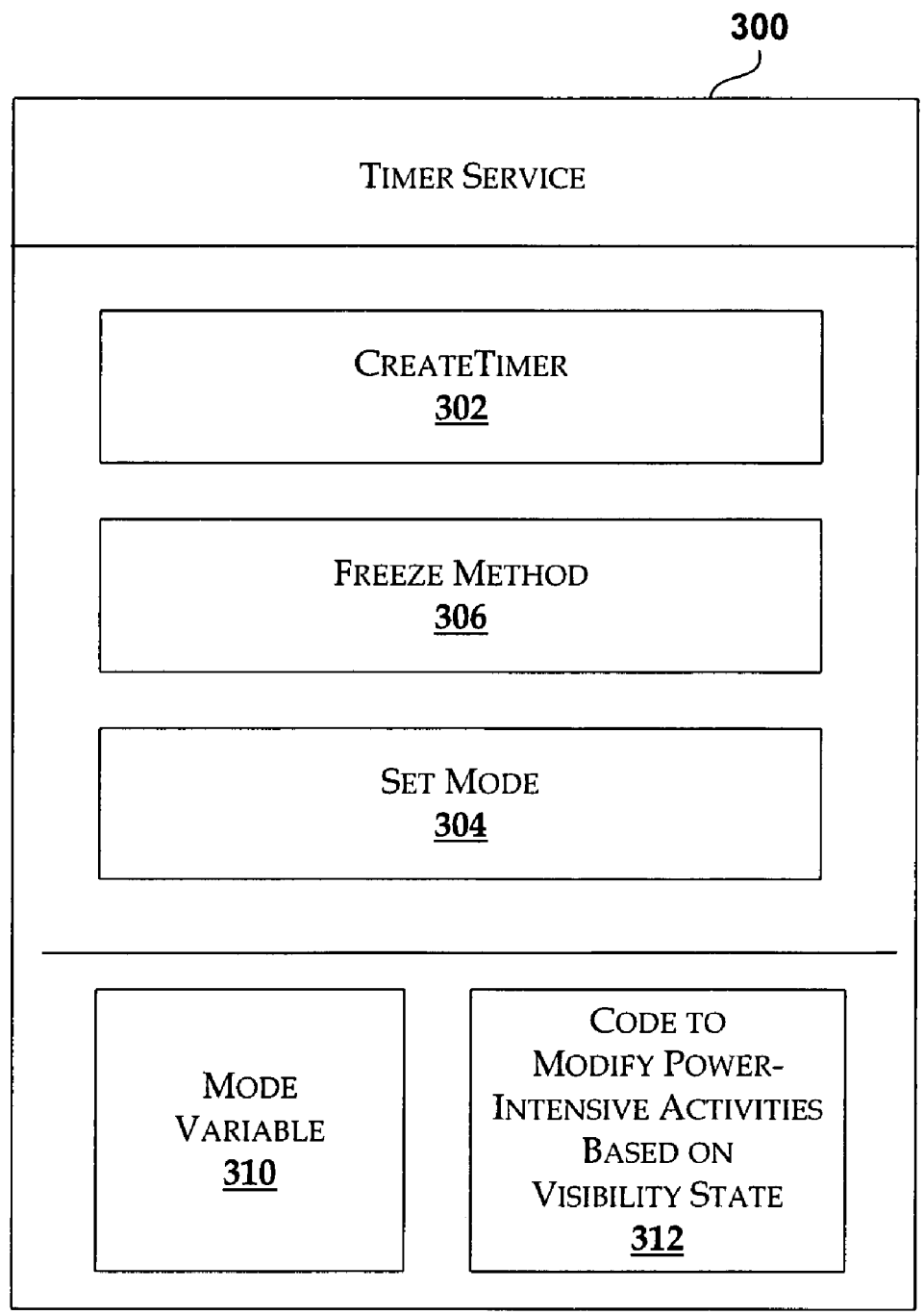
FIG. 3 is a graphical representation of a portion of an application programming interface (API) for an example visibility-aware service.

Events 202-208 represent processing when a window becomes invisible. At event 202, window 104 becomes invisible. As mentioned above, window 104 may become invisible by minimizing the window, by switching the window from a foreground tab to a background tab, or by any other mechanism that makes the window no longer prominently displayed. When window 104 becomes invisible, top-level window 106 receives a notification that window 104 has changed visibility states. At event 204, top-level window 106 sends a notification to layout engine 124 that the state of window 104 has changed. At event 206, layout engine identifies the visibility-aware services associated with the window that changed visibility states. Layout engine then sends a notification that the visibility state has changed to each of the identified visibility-aware services. At event 208, the visibility-aware services receive the notification and recognize that the state has changed to invisible. The visibility-aware service(s) then reduce power intensive activities associated with the service. FIG. 3, in conjunction with the corresponding text, illustrate and describe one example technique for reducing power-intensive activities.

Events 212-218 represent processing when a window becomes visible. At event 212, window 104 becomes visible. When window 104 becomes visible, top-level window 106 receives a notification that window 104 has changed visibility states. At event 214, top-level window 106 sends a notification to layout engine 124 that the state of window 104 has changed. At event 216, layout engine identifies the visibility-aware services associated with the window that changed visibility states. Layout engine then sends a notification that the visibility state has changed to each of the identified visibility-aware services. At event 218, each of the visibility-aware services receives the notification and recognizes that the state has changed to visible. The visibility-aware service(s) then resumes power intensive activities.

Events 220-226 represent processing that occurs upon creation of a visibility-aware service. At event 220, a visibility-aware service is created. FIG. 3, in conjunction with the corresponding text, illustrates and describes one example technique for creating a visibility-aware service. At event 222, layout engine 124 identifies a window associated with the created visibility-aware service and determines a visibility state associated with the window. At event 224, layout engine 124 sends a notification of the state to the created visibility-aware service. At event 226, the visibility-aware service performs power-intensive processing based on the visibility state of the associated window. For example, if the visibility state is visible, power-intensive activities are allowed. If the visibility state is invisible, power-intensive activities are reduced.

One skilled in the art will appreciate that FIG. 2 illustrates example processing to implement the visibility-awareness feature. Not all of the events shown in FIG. 2 need to be executed in order to implement the present visibility-awareness feature. In addition, additional events may be added without departing from the implementation of the present visibility-awareness feature.

Example Implementation of a Visibility-Aware Service

FIG. 3 is a graphical representation of a portion of an example visibility-aware service. The following discussion uses the example visibility-aware service (e.g., timer service) from FIG. 1 to describe the example implementation. In overview, software developers utilize timer services in multimedia and animation applications to provide accuracy and synchronization between multiple time-dependent components. The software developers may create independent timers or dependent timers (i.e., named timers) for various components on web pages.

The present visibility-aware timer service 102 may be an extension to a well-known timer service. The extension for the visibility-aware timer service includes a CreateTimer method 302, a SetMode method 304, a mode variable 310, and code 312. The SetMode method 304 allows a software developer to specify the manner in which the timer operates. The software developer may specify that the timer service operate in a well-known manner where a consumer (e.g., web page) controls the timer. Alternatively, the software developer may specify that the timer service operate in a visibility-aware manner where the timer automatically halts when the window is not visible and restarts when the window becomes visible again. One skilled in the art will readily appreciate that actions performed by the visibility-aware service depend on the type of function provided by the service and may differ from the actions described above, but will be dependent on the visibility of the associated window.

A consumer of the timer API can opt-in to the new visibility-aware aspect by declaring an extended timer pointer and calling SetMode method 304 to specify the visibility-aware mode. In one embodiment, the CreateTimer method 302 defaults to a normal mode of operation that is not visibility-aware. However, in another embodiment, the CreateTimer method may default to the visibility-aware state. The SetMode method 304 modifies a mode variable 310 in accordance with parameters provided with the SetMode method. The mode variable indicates whether the service supports the visibility-awareness feature. Once the mode is set, existing software does need to change in order to utilize the present visibility-awareness feature.

A call to freeze method 306 temporarily halts the timer. When the timer halts, callbacks are suspended and the reported time is locked. Timer events that come due while the clock is frozen are serviced immediately when the clock is unfrozen. The freeze method 306 may utilize conventional techniques to control the clock. The conventional techniques allow local synchronization by temporarily freezing the timer. Freezing the time may be performed explicitly via a control or a script, or implicitly via a container. For example, a container may freeze the timer when the container is painting or when the container is servicing several callbacks at the same time. Controls or scripts may freeze the timer when the controls or scripts execute actions that have timed behavior. For example, if a script wants to start a video and an audio clip simultaneously, the script may freeze the timer, issue the necessary commands, and then unfreeze the timer.

Code 312 modifies power-intensive activities based on the visibility state of the window that the service supports. In one implementation, code 312 may automatically call the freeze method 306 to halt or restart the timer based on the visibility state. By utilizing the conventional technique for controlling the timer, code 312 allows a consumer to override the automatic implementation without causing an error. One skilled in the art will appreciate that there may be many other methods associated with visibility-aware service 300, such a GetTime, Advise, and other methods that enable synchronization. For example, the Advise method may schedule single or periodic notification callbacks. The freeze method 306, described above, suspends these callbacks. The discussion above focuses on the methods used to implement the visibility-awareness feature.

One Embodiment of a Device that Implements a Visibility-Awareness Feature

Figure 4:
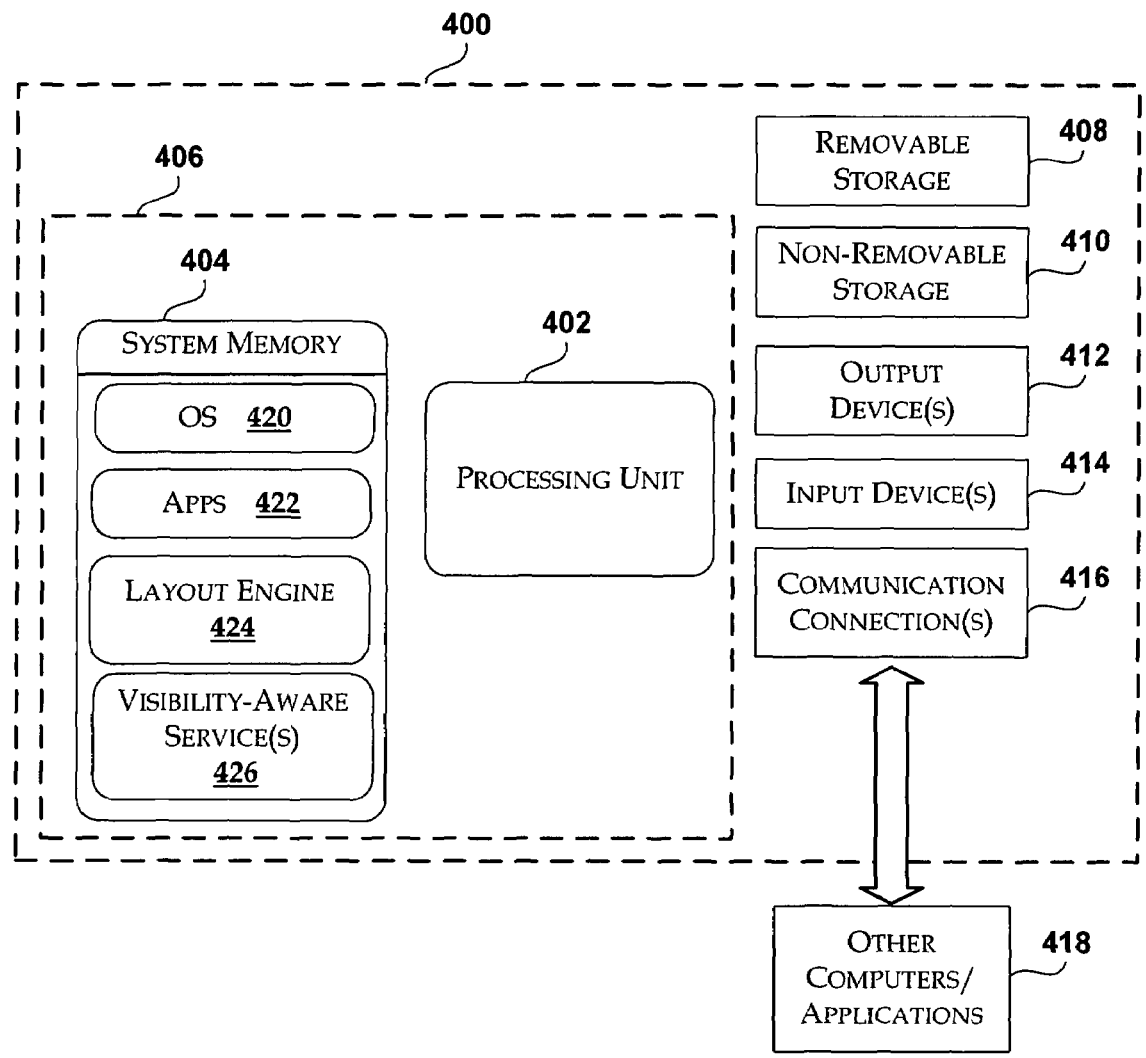
FIG. 4 is a functional block diagram of one example of a computing device that may implement a visibility-awareness feature for controlling power-intensive activities based on a visibility state of a window.

FIG. 4 is a functional block diagram of a computing device that may implement a visibility-awareness feature. Typically, computing device is a mobile computing device that utilizes the present visibility-aware service to prolong battery life. However, computing device may be a non-mobile computing device that derives benefits from utilizing the visibility-aware service in other ways than prolonged battery life. The following describes one possible basic configuration for the computing device 400. The computing device includes at least a processing unit 402 and memory 404. Depending on the exact configuration and type of computing device, memory 404 may be volatile (such as RAM), non-volatile (such as ROM, flash memory, etc.) or some combination of the two. System memory 404 typically includes an operating system 420, one or more applications 422, and may include program data (not shown). Memory 404 may also include a layout engine 424 and one or more visibility-aware services 426. This basic configuration is illustrated in FIG. 4 by dashed line 406.

Additionally, computing device 400 may also have other features and functionality. For example, computing device 400 may also include additional storage (removable and/or non-removable) including, but not limited to, magnetic or optical disks or tape. Such additional storage is illustrated in FIG. 4 by removable storage 408 and non-removable storage 410. Computer-readable storage media includes volatile and nonvolatile, removable and non-removable media implemented in any method or technology for storage of information such as computer readable instructions, data structures, program modules or other data. Memory 404, removable storage 408, and non-removable storage 410 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also include one or more communication connections 416 that allow the computing device 400 to communicate with one or more computers and/or applications 418. Device 400 may also have input device(s) 412 such as keyboard, mouse, pen, voice input device, touch input device, etc. Output device(s) 412 such as a speaker, printer, monitor, and other types of digital display devices may also be included. These devices are well known in the art and need not be discussed at length here.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

As described above, the visibility-aware timer service stops processing animation in web pages that are hidden or minimized. Thus, the visibility-aware timer service effectively reduces power-intensive activities that cause excessive processor usage and drain battery life. The visibility-aware timer service may be an independent timer or may be a named timer used by multiple components. By utilizing the present visibility-awareness feature, applications can provide significant performance improvements. In the above described embodiment, an internal timer clock remains ticking so that the component can handle expiration of the animation. However, as a further refinement, the internal timer clock may cease ticking, which would further reduce battery consumption.

While the above discussion describes an embodiment in which the visibility-aware service is a timer service used for animation, the present visibility-aware services are envisioned for implementation in other environments. For example, the visibility-aware services may suspend spell checking in a minimized window or may suspend audio and/or video playback in a minimized window. These and other actions that decrease the amount of processing required are envisioned.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium having computer-executable instructions that when executed, perform a method comprising:
receiving a notification regarding a change in a visibility state of a window from visible to invisible;
reducing power-intensive activities associated with the window by suspending processing functions executed by components of the window while the visibility state of the window is invisible;
receiving a notification regarding a change in the visibility state of the window from invisible to visible; and
resuming the power-intensive activities associated with the window by servicing events that were due while the processing functions executed by the components of the window were suspended.

2. The computer-readable storage medium recited in claim 1, wherein the window comprises a web page.

3. The computer-readable storage medium recited in claim 2, wherein the power-intensive activities comprise animation of at least one component on the web page.

4. The computer-readable storage medium recited in claim 2, wherein the visibility state of the web page is invisible if the web page is minimized.

5. The computer-readable storage medium recited in claim 2, wherein the visibility state of the web page is invisible when the web page is switched from a foreground tab to a background tab in a tabbed browser.

6. The computer-readable storage medium recited in claim 1, wherein the notifications are received from a layout engine.

7. The computer-readable storage medium recited in claim 1, wherein reducing power-intensive activities associated with the window comprise freezing a clock to suspend callbacks that process the power-intensive activities.

8. The computer-readable storage medium recited in claim 7, wherein the power-intensive activities comprise animation.

9. The computer-readable storage medium recited in claim 1, wherein the window comprises an email and the power-intensive activities comprise spell checking 10. A computer-implemented method comprising:
maintaining a list of visibility-aware services associated with a window;
upon receiving a notification regarding a change in a visibility state of the window from visible to invisible, notifying at least one visibility-aware service from the list regarding the change in the visibility state to alert the visibility-aware service to reduce power-intensive activities associated with the window by suspending processing functions executed by components of the window while the visibility state of the window is invisible; and
upon receiving a notification regarding a change in the visibility state of the window from invisible to visible, notifying the at least one visibility-aware service from the list regarding the change in the visibility state to alert the visibility-aware service to resume the power-intensive activities associated with the window by servicing events that were due while the processing functions executed by the components of the window were suspended.

11. The computer-implemented method recited in claim 10, further comprising adding another visibility-aware service to the list when a component associated with the window creates a service and sets a mode for the service to be visibility-aware.

12. The computer-implemented method recited in claim 10, wherein the list of visibility-aware services is maintained separately for a plurality of windows.

13. The computer-implemented method recited in claim 10, wherein the at least one visibility-aware service comprises a timer service consumed by the window.

14. A computer-implemented method comprising:
associating a service with a window; and
setting a mode associated with the service, the mode specifying that the service operates in a manner to:
reduce power-intensive activities associated with the window by suspending processing functions executed by components of the window while the window is not visible on a display, and
when the window becomes visible on the display, resume the power-intensive activities associated with the window by servicing events that were due while the processing functions executed by the components of the window were suspended.

15. The computer-implemented method recited in claim 14, wherein associating the service with the window comprises calling an application programming interface of the service that creates an object for the service.

16. The computer-implemented method recited in claim 15, wherein calling the application programming interface occurs in code associated with the window.

17. The computer-implemented method recited in claim 14, wherein the service comprises a timer service and the power-intensive activities comprise animation.

18. The computer-implemented method recited in claim 17, wherein the timer service modifies power-intensive activities by freezing a clock to suspend callbacks.

19. The computer-implemented method recited in claim 14, wherein the service comprises a spell checker service and the power-intensive activities comprise spell checking.

20. The computer-implemented method recited in claim 14, wherein the power-intensive activities comprise audio playback.

* * * * *